Aug. 10, 1948.  T. M. KNOWLAND  2,446,771
METHOD OF IMPARTING SURFACE EFFECTS
TO THERMOPLASTIC SHEETS
Filed Dec. 31, 1946
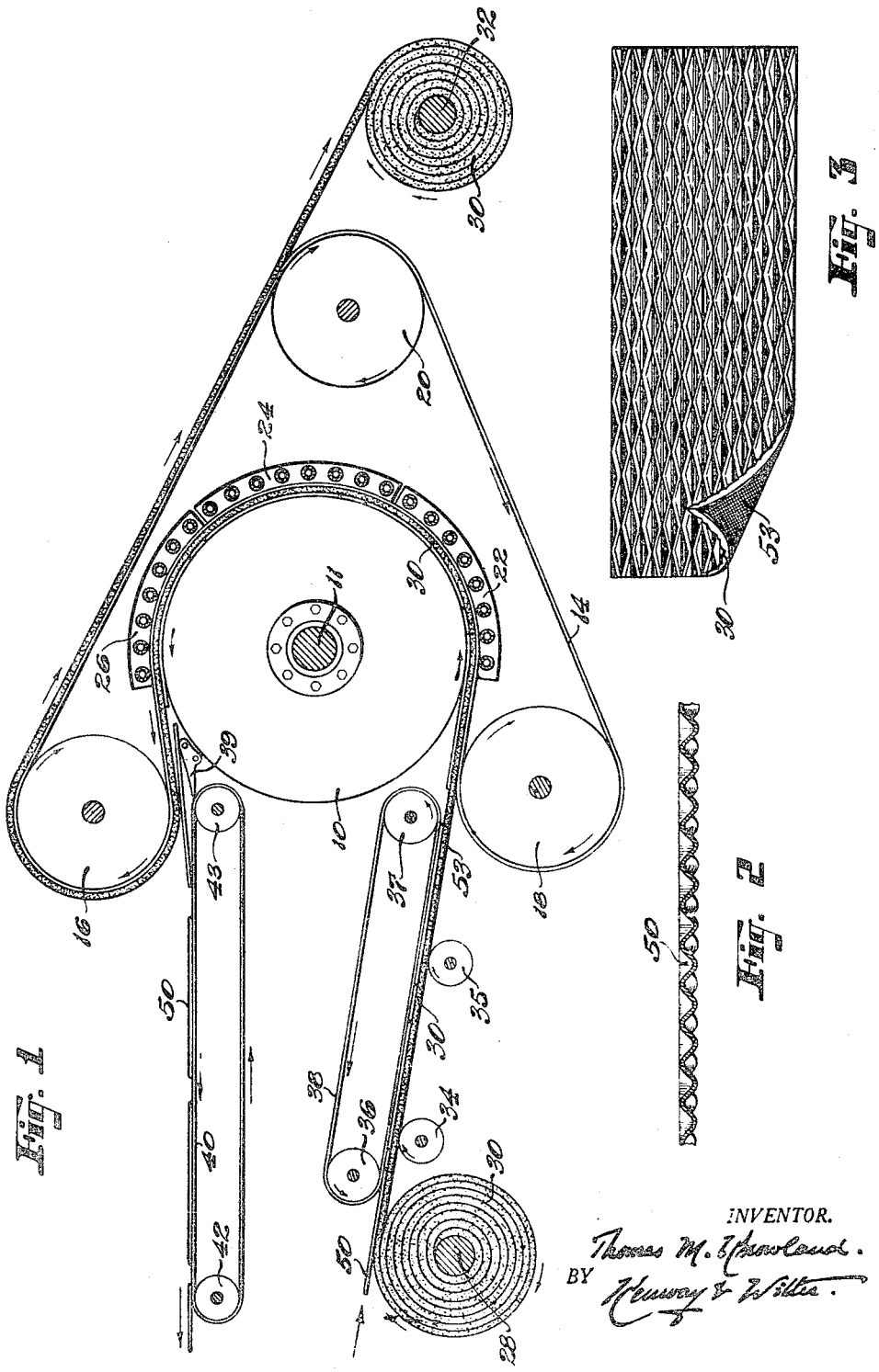
INVENTOR.
Thomas M. Knowland.
BY Kenway & Witter.

Patented Aug. 10, 1948

2,446,771

UNITED STATES PATENT OFFICE 2,446,771

METHOD OF IMPARTING SURFACE EFFECTS TO THERMOPLASTIC SHEETS

Thomas M. Knowland, Belmont, Mass., assignor to Boston Woven Hose & Rubber Company, Cambridge, Mass., a corporation of Massachusetts Application December 31, 1946, Serial No. 719,544

5 Claims. (Cl. 18—53)

My invention comprises a new and improved continuous process of forming an ornamental or decorative surface finish upon sheets of thermoplastic materials of various kinds such as rubber, polymers and copolymers of vinyl acetate, vinyl chloride, vinyl butyral, polyethylene, polystyrene, and the like.

Sheet material of the type discussed is usually heat-formed by calendering pressure at temperatures approximating 135°–150° C. and comes from the calender rolls with a rather dull and undistinguished surface appearance. In order to produce an attractive, marketable product it is highly desirable to treat the surface either to impart to it a smooth glossy sheen or to emboss or mold the surface to form a three-dimensional pattern. Products of this sort are used for stair treads, footwear, upholstering, and many other purposes.

Hitherto it has been customary to pass a length of the sheet material into a long, heated platen mold, and press against the surface with a lengthy and heavy mold plate under conditions of temperature and pressure sufficient to impart to the material the reverse of a pattern carried by the mold plate. Such equipment is necessarily operated on a step-by-step basis; furthermore the plastic material tends to adhere to the mold surface, and it is often necessary to cool the mold before the material can be stripped off. Moreover the mold surface quickly fouls, entailing frequent stoppages for careful cleaning.

Another type of operation has been carried out on continuously operating machinery of the "Rotocure" type disclosed in Patent No. 2,039,271 dated April 28, 1936, and issued to Bierer. This machinery is organized about a heated revolving drum and a cooperating pressure band arranged to press the material against the moving drum. Attempts have been made to provide cylindrical mold shells for the drum but the expense of engraving a thin cylindrical mold and fitting it accurately upon the drum has thus far proved almost prohibitive. Furthermore it is not possible to clean the mold while the machine is in operation. Consequently the drum surface may not be used satisfactorily to produce even a glossy surface, let alone a three-dimensional surface pattern.

The present invention has for its principal object to produce desired surface effects upon thermoplastic sheet material continuously and with maximum efficiency.

The most important feature of the invention resides in using machinery with continuously moving pressure members in conjunction with a series of thin flexible mold plates fed sequentially upon the surface of the sheet as it enters the bite of the pressure members; the plates are flexible enough to conform temporarily to the contour of the pressure members but resilient enough to straighten out when released.

Another feature of the invention comprises applying heat at relatively high temperatures to the pressure band, thermoplastic material, and mold plates at the beginning of the pressure path and then cooling them prior to delivery from the path so that the plates will come easily away from the material.

Still another feature of my invention comprises passing the mold plates through a cleaning step after they emerge from the machine, thus continuously supplying a stock of plates ready for use as fast as others are taken into the machine.

These and other objects and features of the invention will be best understood and appreciated from the following detailed description of a preferred embodiment selected for purposes of illustration and shown in the accompanying drawings, in which:

Fig. 1 is a diagrammatic view in side elevation showing the process in operation with a rotating heated drum, Fig. 2 is a view in cross section through a mold plate, and Fig. 3 is a plan view of the finished product.

The process of my invention may be carried out with the assistance of any apparatus capable of performing the necessary sequence of functions. In Fig. 1 I have shown, diagrammatically, one form of apparatus which has proved eminently satisfactory for the purpose. The machine is organized about a hollow steel drum 10 mounted for rotation on a shaft 11 and coupled to a stem line (not shown) by means of which the drum is heated to desired temperatures. I have found that a drum approximately 74" long and 5' in diameter will produce satisfactory results when rotated at a rate of roughly six revolutions per hour. A thin flexible steel pressure band 14 is looped about a top roll 16, a bottom roll 18 and a back roll 20 and passes over the surface of the drum 10 for approximately 230°. The back roll 20 is mounted in adjustable bearings (not shown) by means of which the back roll 20 can be moved to and from the drum 10 in order to vary the pressure of the band 14 upon the surface of the drum 10.

Mounted externally of the drum and the pressure band 14 is a heat transfer jacket of three segments. In the first segment 22 there is disposed a number of coils of tubing through which hot fluid or gas may be passed in order to apply heat to the pressure band 14 and to material fed between the band and the drum 10. The second segment 24 also carries a number of coils as does the third segment 26. In carrying out the process of my invention I prefer to pass high temperature gas or fluid through the coils in the segment 22, gas or fluid at a lower temperature through the coils in the segment 24 and refrigerated fluid through the coils in the segment 26. In front of the machine there is a shaft or reel 28 upon which is rolled up a long sheet or strip of the thermoplastic material which is to be treated, and the sheet is led over a pair of idler rolls 34 and 35 and the band 14 and the surface of the drum 10; the sheet material 30 follows the band 14 around the top roll 16 and to the back roll 20 and then continues to another roll 32 on which the treated material is wound up. Mounted above the sheet material 30 between the roll 28 and the bottom roll 18 are a pair of rolls 36 and 37 which support an endless belt 34. At the top of the drum 10 where the band 14 and the material 30 leave the surface of the drum there is mounted an angularly disposed discharging plate 39 extending across the complete width of the drum and leading to a second endless belt 40 carried by a pair of rolls 42 and 43.

I provide a number of thin, flexible, resilient metal plates 50 preferably made of steel and carrying on at least one surface the reverse of the type of finish desired to be imparted to the surface of the sheet material 30. When a smooth glossy surface is desired, the mold plates are flat, highly polished, and roughly .025" thick. When a three-dimensional pattern is to be imparted to the surface of the sheet material 30, the mold plates used have a section thickness on the order of .065", are engraved, embossed, stamped, or otherwise treated to produce on their surfaces the reverse of the desired pattern. In Fig. 2 I have illustrated in cross section a typical mold plate used to produce a waffle or grid surface effect. Of course any metal having the necessary characteristics may be employed. In Fig. 3 I have shown finished sheet material 30 exhibiting one type of surface which can be produced by the process of my invention. In this case the sheet material includes a thermoplastic layer 30 spread over a backing ply or lining 53 of fabric which forms a base or foundation. When the process is to be carried out the drum 10 is set in motion and one of the rolls 16, 18 or 20 is driven to cause the band 14 to move with the drum 10 and at the same speed as the surface speed of the drum. The mold plates 50 are fed onto the sheet material 30 and into the bite between the material and the endless belt 38 which is driven at the proper speed by means not shown. As soon as one of the mold plates 50 has disappeared under the belt 38 another one is fed in, with any suitable spacing between the two or in abutting relation. The plates 50 are carried sequentially into the bite between the drum 10 and the material 30 which is being pressed against the surface of the drum 10 by the pressure band 14. Alternatively, for certain molding operations I may feed the mold plate 50 into the apparatus between the material 30 and the pressure band 14. In the illustrative embodiment, however, the process is described wherein the plates 50 are fed between the material 30 and the drum surface. The mold plates 50 are thin enough and flexible enough to conform to the arc of the surface of the drum.

The coils in the jacket segment 22 apply heat to the band and to the material 30 as well as to the mold plates 50. The drum 10 is also steam heated, as previously described. The heat thus applied softens the thermoplastic material 30 which is pressed against the surface of the mold plates 50. If a selected mold plate 50 has a three-dimensional pattern, the thermoplastic material 30 flows into the depressions or valleys and assumes the reverse of the pattern on the plate. When the plate reaches that portion of the path about the drum adjacent the coils in the segment 24 the temperature slowly begins to reduce, approaching the hardening point of the material 30. When the plate reaches the portion of the path about the drum adjacent the segment 26, heat is withdrawn from the band, the material, and the plate and the thermoplastic material is cooled below the hardening point. When the plate 50 begins to emerge from the bite of the band and the drum, its natural resiliency lifts it away from the surface of the drum 10 and it slides on the top of the discharging plate 39. At one point in its travel, the rear end of each mold plate 50 will be held against the surface of the drum by the band 14 and the material 30, while the forward end of the plate is free. At that same time the forward portion of the material 30 formerly against the plate 50 is being curved up to follow the band 14 about the surface of the top roll 16. The result is a resilient force tending to separate the plate 50 from the thermoplastic material 30. The fact that the thermoplastic material has been cooled makes it easy to separate the plate 50 from the sheet of material 30 and the plate 50 drops onto the endless belt 40 which carries it away from the drum 10.

From the belt 40 the mold plates 50 may be carried manually or on a conveyor system to a cleaning station. Here an operator scrubs each plate with a suitable cleanser such, for example, as a soap solution containing abrasive matter. The plates are rinsed and dried and are then ready to be fed back onto the material 30. It is contemplated that for an efficient continuous process there will be provided a sufficient number of the plates and cleaning stations so that clean plates are delivered at the same rate as others are being fed onto the material 30. In this manner it is brought about that the molding surfaces of the plates are always in prime condition before the molding operation is carried out.

It is to be understood that the process of my invention is by no means limited to the form of apparatus shown in the drawing. It is only necessary to provide a pair of pressure members which can be moved continuously to form a pressure path of satisfactory length through which the material and the plates may be moved and to which varying amounts of heat may be applied. The apparatus shown in the drawing is the most efficient and convenient presently known to me for the purpose of practicing the process I have invented.

An important advantage of my apparatus and process is that the mold patterns may be changed at will without interrupting the operational cycle. If one mold plate should ever become fouled with and spoil the surface of the material 30, the damage would be confined to the area of that one mold plate only, hence work spoilage from any cause is kept at a minimum.

I may provide mold plates 50 which are equal in length to the width of the sheet of material along an element of the drum surface 21 or I may feed two or more mold plates at a time each half as long as the material width or length, and each having a surface characteristic or contour different from the other so as to mold two or more different patterns upon different portions of the same sheet material simultaneously.

It will thus be seen that there has been provided by this invention a method and apparatus in which the various objects hereinabove set forth together with many thoroughly practical advantages are successfully achieved.

As various possible embodiments might be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense. Having thus disclosed my invention and described in detail a preferred manner of practicing it, I claim as new and desire to secure by Letters Patent:

1. A continuous process of imparting ornamental surface finish to thermoplastic sheets, which includes the steps of passing an endless pressure band in a looped path about a substantial portion of the circumference of a heated rotating drum, introducing a thermoplastic sheet between the drum and pressure band thereby advancing the sheet under conditions of heat and pressure, and feeding a series of thin flexible metal plates between the drum and the sheet, each plate having a three dimensional surface pattern disposed to lie against the sheet.

2. A continuous process of imparting an ornamental surface finish to thermoplastic sheets, which includes the steps of passing a sheet into the bite of a heated cylinder and a pressure band moving simultaneously in an extended arcuate path, and sequentially feeding into the bite a series of thin flexible metal molds having embossed surfaces, the embossed surfaces being fed into contact with one surface of the thermoplastic material, applying heat externally upon said band in progressively decreasing amounts from the bite along a portion of the arcuate path, and withdrawing heat from the band, sheet, and mold while in said arcuate path in advance of the delivery end thereof.

3. A continuous process of imparting an ornamental surface finish to thermoplastic sheet material, which includes feeding the sheet into the bite of a revolving heated drum and an endless pressure band moving through a looped path including a substantial portion of the circumference of the drum, laying upon the sheet before it reaches the drum a series of thin flexible plates having surfaces arranged to contact the sheet and treated to produce desired surface effects thereon, heating the band, sheet and plates during the first portion of the passage about the drum, and cooling the band, sheet and plates before the end of the passage about the drum.

4. A continuous process of imparting an ornamental surface finish to thermoplastic sheet material, which includes feeding the sheet into the bite of a revolving heated drum and an endless pressure band moving through a looped path including a substantial portion of the circumference of the drum, laying upon the sheet before it reaches the drum a series of thin flexible plates having surfaces arranged to contact the sheet and treated to produce desired surface effects, heating the band, sheet and plates to a relatively high temperature during the initial portion of their passage about the drum, and progressively lowering the temperature of the drum, sheet and plates until the temperature of the sheet drops below the softening point of the thermoplastic material prior to completion of the passage about the drum.

5. The process of continuously molding thermoplastic sheet material under conditions of pressure and heat which includes the steps of feeding the material and traversing it between a pressing member whose surface is linearly movable and a flexible pressure member looped over part of the surface of said pressing member and cooperatively moving with its surface, feeding flexible mold plates between the pressing member and the pressure member in contact with the material, one surface of said mold plates having been conformed to mold said material as desired, said material being cooled below its softening point during one stage of the process, and separating the cool material and the mold plates.

THOMAS M. KNOWLAND.

REFERENCES CITED

The following references are of record in the file of this patent:

UNITED STATES PATENTS

| Number | Name | Date |
|---|---|---|
| 986,162 | Gare | Mar. 7, 1911 |
| 2,232,551 | Merton | Feb. 18, 1941 |
| 2,240,251 | Baker et al. | Apr. 29, 1941 |
| 2,292,366 | DeWyk | Aug. 11, 1942 |
| 2,310,642 | March | Feb. 9, 1943 |